United States Patent [19]

Amelio et al.

[11] Patent Number: 5,544,449
[45] Date of Patent: Aug. 13, 1996

[54] AIRCRAFT DUPLEX HINGE ASSEMBLY

[75] Inventors: Armand F. Amelio, New Milford; David N. Susek, Monroe, both of Conn.

[73] Assignee: United Technologies Corporation, Hartford, Conn.

[21] Appl. No.: 139,257

[22] Filed: Oct. 20, 1993

[51] Int. Cl.$^6$ ................................................. E05D 11/00
[52] U.S. Cl. ........................... 49/383; 16/352; 16/366; 49/246; 49/261; 244/129.5
[58] Field of Search ............................. 49/394, 246, 261, 49/383; 16/366, 352, 319; 244/129.5, 129.4

[56] References Cited

U.S. PATENT DOCUMENTS

| | | | |
|---|---|---|---|
| 2,224,825 | 1/1940 | Krakauer et al. | 5/47 |
| 2,763,900 | 9/1956 | McAfee et al. | 20/16 |
| 2,901,783 | 9/1959 | Soddy | 20/21 |
| 3,016,261 | 1/1962 | Tatter | 296/46 |
| 3,591,111 | 7/1971 | Spence | 244/137 |
| 4,372,603 | 2/1983 | Stanczak et al. | 296/146 |
| 4,415,197 | 11/1983 | Meyer | 296/216 |
| 4,479,622 | 10/1984 | Howse | 49/246 X |
| 4,552,326 | 11/1985 | Bokalot | 49/246 X |
| 4,726,146 | 2/1988 | Opsahl | 49/383 |
| 4,854,010 | 8/1989 | Maraghe et al. | 244/129.5 X |
| 5,018,687 | 5/1991 | Kupfernagel et al. | 244/129.5 |
| 5,035,026 | 7/1991 | Carlo et al. | 550/994 |

*Primary Examiner*—Philip C. Kannan
*Attorney, Agent, or Firm*—Terrance J. Radke

[57] ABSTRACT

An aircraft duplex hinge assembly (10 or 10') configured for use in aircraft, especially helicopters, having a compound curvature airframe (130) configuration wherein the edges of access panels (100) and the corresponding airframe apertures have a beveled configuration. The duplex hinge assembly (10 or 10') includes dual hinge mechanisms (20) and a latching mechanism (50) to deactivate the duplex hinge mechanism (10) with the access panel (100) in the closed position. The dual hinge mechanisms (20) include a primary mounting bracket (22) secured in combination with the airframe (130), a secondary mounting bracket (24) secured in combination with the access panel (100), and an interconnecting member (26) having a straight segment (30), an arcuate segment (32), and a protective flat segment (34). The straight and protective flat segments (30, 34) are mounted in rotatable combination with the primary and secondary mounting brackets (22, 24), respectively, and the protective flat segment (34) protects the access panel (100) from damage during opening and closing. One embodiment of the duplex hinge assembly (10) further includes an aft locking subassembly (40) that functions as the primary means for maintaining the access panel (100) in the closed position. Another embodiment of the duplex hinge assembly (10') includes a stabilizing member (60) secured in combination with the interconnecting members (26) and operative to stabilize the hinge mechanisms (20) and the access panel during opening and closing sequencing. Optionally, either embodiment of the duplex hinge assembly (10 or 10') may include a panel support assembly (70) that is operative to support and maintain the access panel (100) in a partially or fully open position.

12 Claims, 4 Drawing Sheets

5,544,449

AIRCRAFT DUPLEX HINGE ASSEMBLY

RELATED APPLICATION

This application is related to commonly-owned, co-pending U.S. patent application Ser. No. 08/118,066, filed 8 Sep. 1993, entitled LOW PROFILE LATCH MECHANISM (S-4600).

TECHNICAL FIELD

The present invention relates generally to hinges for aircraft access panels/doors, and more particularly to an aircraft duplex hinge assembly for an aircraft, particularly helicopters, having compound curvature airframes that eliminates external structural discontinuities in the access panel and airframe combination.

BACKGROUND OF THE INVENTION

Low radar observability (LO) may be a critical design requirement for certain types of aircraft, e.g., reconnaissance helicopters. To satisfy the LO design requirement, the aircraft is configured and/or fabricated to minimize the radar signature reflected to ground and/or air-based scanning/tracking radars. One method of achieving LO characteristics in aircraft is to minimize abrupt contour changes or structural discontinuities in the external surface of the aircraft fuselage. Abrupt contour changes/structural discontinuities change the electrical impedance of the aircraft fuselage which increases the cumulative aircraft signature due to reflected radar energy.

External latching mechanisms and panel/door hinge combinations for securement of aircraft fuselage panels/doors create structural discontinuities which increase the reflected radar signature of aircraft. One prior art solution for minimizing the radar signature of such structural discontinuities includes absorptive coatings applied to the latch mechanism and door hinge combination to absorb a portion of the incident radar energy. Another solution is to shape the latch mechanism and/or door hinges to minimize the amount of radar energy reflected therefrom. While such solutions are generally effective, such solutions tend to increase the overall system cost of the aircraft.

Still another solution is to provide internal latch mechanism and door hinge combinations that eliminate external structural discontinuities. Such combinations, however, may be of limited utility where internal access is required for engagement/disengagement of the latch mechanism for access panel/door opening and closure. The utility of such internal combinations is limited for many applications, e.g., equipment bays, access doors/panels, etc. that must be externally accessible.

A need exists to provide a hinge assembly for aircraft access doors/panels that eliminates external structural discontinuities in the aircraft airframe. The internal hinge should provide a swing radius that allows the access door/panel to be fully opened to provide external access. The hinge assembly should be configured and operative to preclude strike damage to the access panel during opening and closing thereof. The internal hinge should be simple to fabricate, assemble, and install, and possess a high degree of reliability.

SUMMARY OF THE INVENTION

One object of the present invention is to provide a duplex hinge assembly for aircraft having a compound curvature airframe that eliminates external structural discontinuities adjacent the access panels thereof.

Another object of the present invention is to provide a duplex hinge assembly that is automatically operative during access panel opening sequencing to protect the edges of the access panel from strike damage.

A further object of the present invention is to provide a duplex hinge assembly that includes a means for maintaining the access panel in the closed position and concomitantly accommodating the motion of the aft beveled locking edge of the access door during the opening and closing sequencing thereof.

Yet another object of the present invention is to provide a duplex hinge assembly that includes a means for supporting and maintaining the access panel in partially and fully open positions during opening sequencing of the access panel.

One more object of the present invention is to provide a duplex hinge assembly that includes a means for stabilizing the duplex hinge assembly and the access panel during opening and closing sequencing of the access panel to preclude torqueing thereof.

These and other objects are achieved by an aircraft duplex hinge assembly according to the present invention that is configured for use in aircraft, especially helicopters, having a compound curvature airframe configuration. The access panels of such aircraft have forward and side edges having an open beveled configuration and an aft edge having a locking beveled configuration that interacts with the airframe to secure the access panel in the closed position.

The duplex hinge assembly comprises dual hinge mechanisms and a latching mechanism to deactivate the duplex hinge mechanism with the access panel in the closed position. The dual hinge mechanisms include a primary mounting bracket secured in combination with the airframe, a secondary mounting bracket secured in combination with the access panel, and an interconnecting member having a straight segment, an arcuate segment, and a protective flat segment. The straight segment is mounted in rotatable combination with the primary mounting bracket and the protective flat segment is mounted in rotatable combination with the secondary mounting bracket.

During opening of the access panel, simultaneous rotation of the straight and protective flat segments about the primary and secondary mounting brackets, respectively, causes an outward and forward motion of the access panel wherein the aft locking beveled edge thereof disengages from the airframe. Continued rotation of the interconnecting member causes the protective flat segment to abuttingly engage the secondary mounting bracket. Such abutting engagement precludes the forward open beveled edge of the access panel from striking the airframe during opening operations. Further rotation of the straight segment with respect to the primary mounting bracket brings the access panel to the open position.

One embodiment of the duplex hinge assembly includes an aft locking subassembly comprising an aft alignment pin mounted to the access panel and a spherical bearing mounted to the airframe. The aft bearing subassembly functions as the primary means for maintaining the access panel in a closed position. The aft alignment pin and the spherical bearing are interactively operative to accommodate the movement of the aft locking beveled edge of the access panel during opening and closing sequencing thereof.

Another embodiment of the duplex hinge assembly includes a stabilizing member secured in combination to the respective interconnecting members. The stabilizing member is operative during opening and closing sequencing of the access panel to stabilize the dual hinge mechanisms and the access panel to preclude torqueing of the access panel.

Optionally, either of the described embodiments of the duplex hinge assembly may further include a panel support subassembly that is operative to support and maintain the access panel in partially or fully open positions during opening sequencing of the access panel.

BRIEF DESCRIPTION OF THE DRAWINGS

A more complete understanding of the present invention and the attendant features and advantages thereof may be had by reference to the following detailed description the invention when considered in conjunction with the accompanying drawings wherein.

DETAILED DESCRIPTION OF PREFERRED EMBODIMENTS

Figure 1:
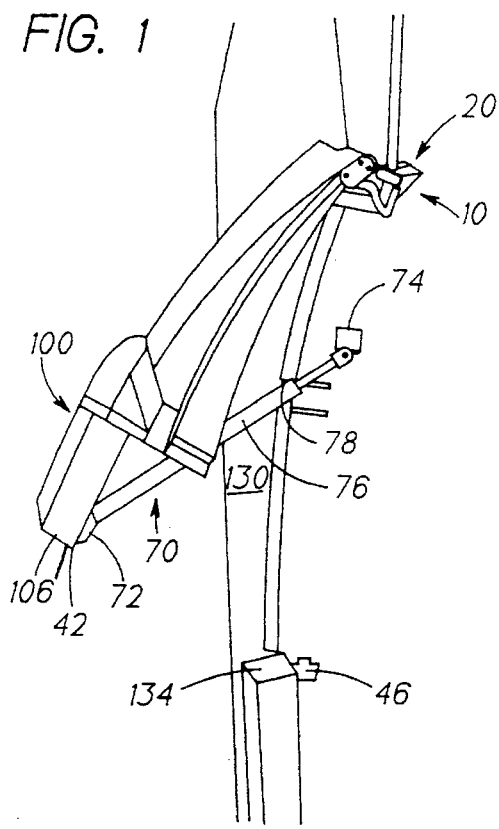
FIG. 1 is an external perspective view of one embodiment of an aircraft duplex hinge assembly according to the present invention mounted in combination with a transmission access door and aircraft airframe, which illustrates the access door partially opened to a maintenance inspection position.
Figure 1A:
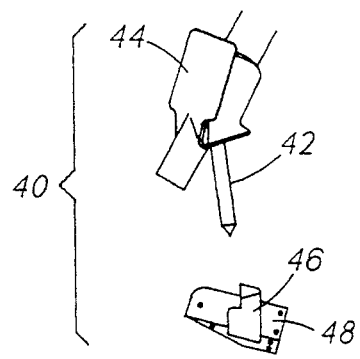
FIG. 1A is a perspective view of an aft locking subassembly for the duplex hinge assembly of FIG. 1.
Figure 2A:
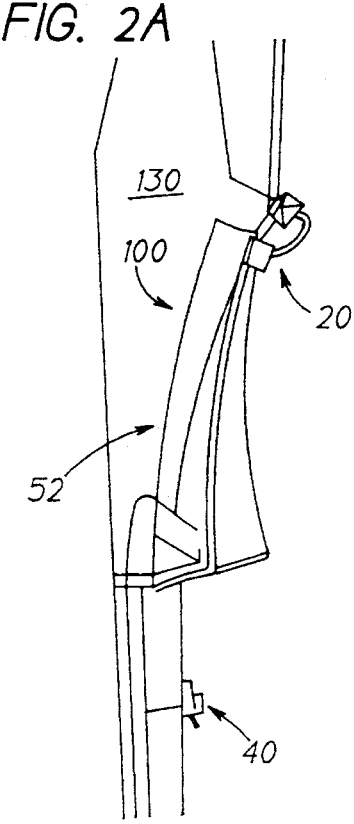
FIG. 2A is a perspective view of the duplex hinge assembly of FIG. 1 illustrating the access door in the closed position.
Figure 2B:
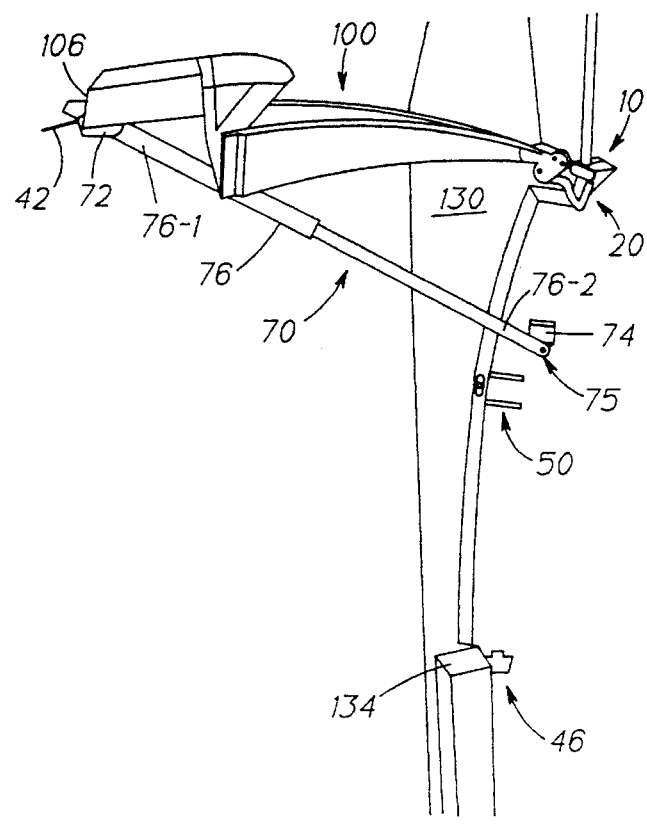
FIG. 2B is a perspective view of the duplex hinge assembly of FIG. 1 illustrating the access door in the fully open position.

Referring now to the drawings wherein like reference characters identify corresponding or similar elements throughout the several views, FIGS. 1–2 and 3–4 illustrate embodiments of an aircraft duplex hinge assembly 10, 10', respectively, according to the present invention that is secured in combination with an access panel 100 and the aircraft airframe 130 and operative to facilitate opening and closing movements of the access panel 100 vis-a-vis the airframe 130. The embodiment of the duplex hinge assembly 10 of FIGS. 1–2 includes dual hinge mechanisms 20, 20, an aft locking subassembly 40, and latching means 50. The embodiment of the duplex hinge assembly 10' of FIGS. 3–4 includes dual hinge mechanisms 20, 20, latching means 50, and a stabilizing member 60. Optionally, the duplex hinge assembly 10 of FIGS. 1–2 may also include a stabilizing member 60. Furthermore, either duplex hinge assembly 10 or 10' or both may optionally include a panel support subassembly 70 (see FIGS. 1, 2B).

The duplex hinge assemblies according to the present invention are configured for internal mounting in combination with the access panel 100 and the airframe 130 to eliminate external structural discontinuities in the access panel 100 and the airframe 130. The duplex hinge assembly is configured for use in aircraft having a compound curvature airframe, i.e., the edges of the airframe 130 defining the aperture for the access panel 100 are beveled (as opposed to conventional frame edges which are typically straight, i.e., 90°). The duplex hinge assembly according to the present invention has particular utility in combination with the compound curvature airframe of the RAH-66 Comanche helicopter being developed by the assignee of the instant application. For example, the duplex hinge assembly 10 illustrated in FIGS. 1–2 is utilized in combination with the transmission access door of the RAH-66 helicopter.

Figure 3:
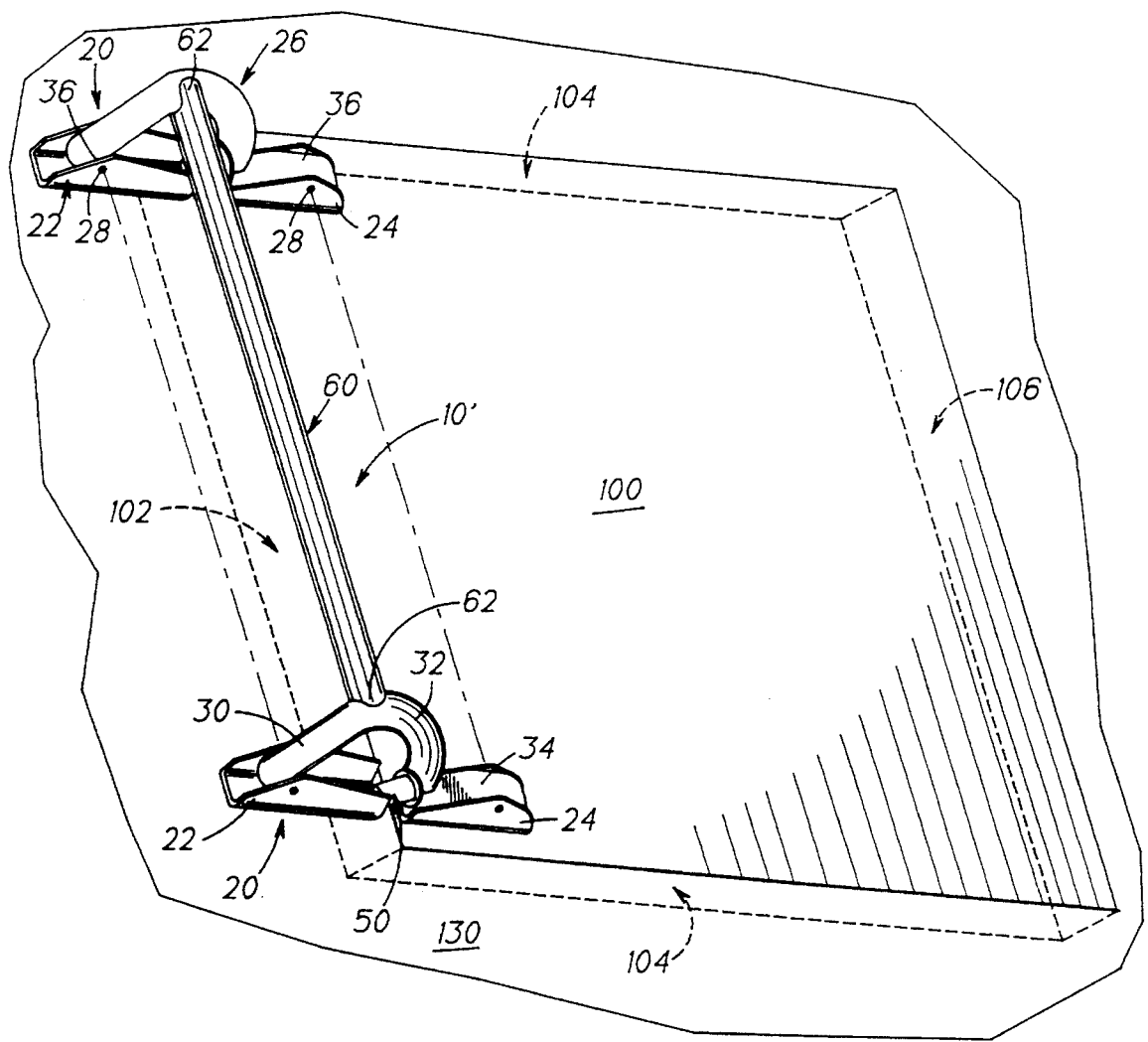
FIG. 3 is a perspective internal view of another embodiment of an aircraf duplex hinge assembly according to the present invention mounted in combination with an aircraft airframe and access panel.

As used herein, the "panel" terminology is intended to encompass, in addition to panels, doors or any other movable members that are used to close off access apertures in an aircraft airframe. With reference to FIGS. 1, 3, the forward and side edges 102, 104, respectively, of the access panel 100 have an open beveled configuration and the aft edge 106 of the access panel 100 has a locking beveled configuration. The airframe 130 has complementarily-configured beveled edges, and in particular, forward and aft beveled edges 132, 134 (see FIG. 4). The interaction between the beveled edges of the access panel 100 and the complementarily-configured beveled edges of the airframe 130, and in particular the locking beveled edge 106 and the aft beveled edge 134, facilitates securement of the access panel 100 in the closed position, and, in addition, ensures a seamless closure of the access panel 100 in combination with the airframe 130.

The dual hinge mechanisms 20, 20 for the embodiments 10, 10' are operative to secure the access panel 100 in combination with the aircraft airframe 130 such that the access panel 100 is movable with respect to the airframe 130 as described in further detail hereinbelow. Each hinge mechanism 20, 20 includes a primary mounting bracket 22, a secondary mounting bracket 24, and an interconnecting member 26. The primary mounting bracket 22 is configured to be secured in combination with the airframe 130 adjacent the forward beveled edge 132 thereof. The secondary mounting bracket 24 is configured to be secured in combination with the access panel 100 adjacent the forward open beveled edge 102 thereof. Conventional techniques such as screw fasteners, bonding, may be utilized to secure the mounting brackets 22, 24 in combination with the airframe 130 and the access panel 100, respectively. Each mounting bracket 22, 24 includes means 28 for mounting the interconnecting member 26 in rotational combination with the brackets 22, 24 (see FIG. 3). For the embodiments illustrated, the mounting means 28 comprises an aperture extending through the respective brackets 22, 24.

The interconnecting member 26 is an integral structural member having a "gooseneck" configuration that provides a broad degree of rotation for opening of the access panel 100. The interconnecting member 26 includes a straight segment 30, an arcuate segment 32, and a protective flat segment 34. The free ends of the straight segment 30 and the protective flat segment 34 include means 36 for mounting the straight segment 30 and the protective flat segment 34 in rotatable combination with the primary and secondary mounting brackets 22, 24, respectively (see FIG. 3). For the embodiments illustrated, the mounting means 36 comprises an aperture extending through the free ends of the straight segment 30 and the protective flat segment 34 and corresponding pins configured to be inserted through the aligned apertures 28, 36 to mount the straight segment 30 and the protective flat segment 34 in rotatable combination with the primary and secondary mounting brackets 22, 24, respectively.

The protective flat segment 34 of the interconnecting member 26 is operative to prevent damage to the forward open beveled edge 102 of the access panel 100 during opening operations thereof. Damage prevention is effectuated by the protective flat segment 34 abutting against the secondary mounting bracket 24 during the opening and closing sequences, as described hereinbelow in further detail.

Figure 3A:
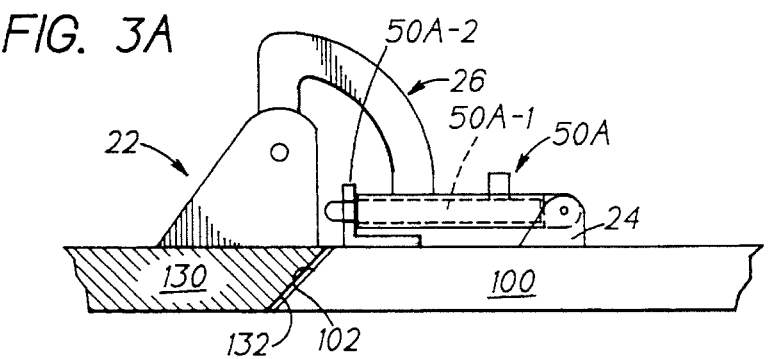
FIG. 3A illustrates an alternative latching means for the aircraft duplex hinge assembly of FIG. 3.

The latching means 50 for the duplex hinge assemblies 10, 10' is operative to lock the access panel 100 in the closed position (see FIG. 4), i.e., to deactivate the duplex hinge assembly 10 or 10' with the access panel 100 in the closed position to preclude movement of the access panel 100 with respect to the airframe 130. For the described embodiment of the duplex hinge assembly 10' of FIGS. 3–4, the latching means 50 comprises locking plungers disposed in combination with the corresponding secondary mounting brackets 24. The locking plungers 50 are displaceable to mechanically engage the respective primary mounting brackets 22 to lock the access panel 100 in the closed position, i.e., pivotal movement between the primary mounting brackets 24 and the corresponding interconnecting members 26 is precluded. An alternative embodiment of a latching means 50A is illustrated in FIG. 3A. The latching means 50A comprises displaceable locking plungers 50A-1 disposed in combination with the corresponding secondary mounting brackets 24 and complementary latches 50A-2 secured in combination with the access panel 100. With the latching means 50A in the locked position (as shown in FIG. 3A wherein the locking plunger 50A-1 is mechanically engaged with the respective latch 50A-2), the duplex hinge assembly 10 or 10' is deactivated, i.e., pivotal movement between the secondary mounting brackets 24 and the corresponding interconnecting members 26 is precluded.

Embodiments of the low profile latch mechanism described in commonly-owned, co-pending U.S. patent application Ser. No. 08/118,066, filed 8 Sep. 1993, entitled LOW PROFILE LATCH MECHANISM (S-4600) may also be utilized as the latching means for the duplex hinge assembly 10 or 10' according to the present invention. For example, the embodiments of the low profile latch mechanism described with respect to FIGS. 1–3 and 6, respectively, of the foregoing patent application would be compatible with the embodiments of the duplex hinge assembly 10, 10' described herein (see FIG. 2B which depicts the latch mechanism 50 in combination with the duplex hinge assembly 10). The embodiments of the low profile latch mechanism depicted in FIGS. 1–3 and 6 of the foregoing patent application include an insert mounted in rotatable combination with the access panel and a captured floating nut non-rotatably mounted in combination with the airframe. During the final sequencing of the closing operation of the access panel, the insert is threaded into engagement with the captured floating nut so as to lock the access panel in the closed position. The latch mechanism is accessed by means of a minimized access aperture that extends through the access panel 100 (reference numeral 52 in FIG. 2A).

The embodiment of the aircraft duplex hinge assembly 10 depicted in FIGS. 1–2 includes the aft locking subassembly 40. The aft locking subassembly 40 comprises an aft alignment pin 42, a mounting bracket 44 for the aft alignment pin 42, a spherical bearing 46, and a mounting bracket 48 for the spherical bearing 46. The aft alignment pin 42 is secured to the access panel 100 adjacent the aft locking beveled edge 106 by means of the mounting bracket 44. Conventional techniques such as screw fasteners, bonding, may be utilized to secure the bracket 44 to the access panel 100. The spherical bearing 46 is secured to the airframe 130 adjacent the aft beveled edge 134 by means of the mounting bracket 48. Conventional techniques such as screw fasteners, bonding, may be utilized to secure the bracket 48 to the airframe 130. The aft alignment pin 42 and the spherical bearing 46 are mounted so that the aft alignment pin 42 is aligned for insertion into and frictional engagement with the spherical bearing 46 during the final steps of the access panel 100 closing sequence. The spherical bearing 46 is operative to accommodate the motion of the alignment pin 42 as a result of the motion of the aft locking beveled edge 106 of the access panel 100 during the initial steps of the access panel 100 opening sequence (as well as the final steps of the access panel 100 closing sequence) described hereinbelow.

For the duplex hinge assembly 10 embodiment of FIGS. 1–2, the aft locking subassembly 40 functions as the primary means for maintaining the access panel 100 in the closed position. The mechanical interaction between the aft beveled locking edge 106 and the complementarily-configured aft beveled edge 134 functions as a secondary means for maintaining the access panel 100 in the closed position. In contrast, the mechanical interaction between the aft beveled locking edge 106 and the complementarily-configured aft beveled edge 134 functions as the primary means for maintaining the access panel 100 in the closed position for the embodiment of the duplex hinge assembly 10' of FIGS. 3–4.

The panel support subassembly 70 (see FIGS. 1, 2B) may be incorporated in either one or both embodiments of the aircraft duplex hinge assembly 10, 10' described hereinabove. The panel support subassembly 70 is operative to support and maintain the access panel 100 in a partially open position, i.e., the maintenance inspection position (see FIG. 1) or the fully open position (see FIG. 2B). The panel support subassembly 70 includes a first mounting bracket 72, a second mounting bracket 74, a telescoping member 76, and a detent mechanism 78 operatively disposed in combination with the telescoping member 76. The first mounting bracket 72 is secured to the access panel 100 and the second mounting bracket 74 is secured to the airframe 130 by conventional means such as screw fasteners, bonding. One end 76-1 of the telescoping member 76 is rotatably mounted in combination with the first mounting bracket 72 by conventional means. The other end 76-2 is rotatably mounted in combination with the secondary mounting bracket 74 by means of a quick release pin 75. For the aircraft duplex hinge assembly 10 embodiment of FIGS. 1–2, a single bracket may functionally replace the mounting brackets 44, 72 described hereinabove, i.e., the single bracket is operative to secure the aft alignment pin 42 in combination with the access panel 100 while simultaneously mounting the end 76-1 of the telescoping member in rotatable combination with the access panel 100.

The panel support subassembly 70 described herein has particular utility in combination with the transmission access door and airframe of the RAH-66 Comanche helicopter. In the RAH-66 Comanche helicopter the transmission access door in the fully open position extends into the rotor plane defined by the rotor blades of the rotor assembly. During the access panel 100 opening sequence described in the following paragraphs, the telescoping member 76 extends as the transmission access door is moved through the opening sequence. When the transmission access door reaches the maintenance inspection position illustrated in FIG. 1 during the opening sequence, the detent mechanism 78 engages the telescoping member 76 to stop further extension thereof. The stop alerts the maintenance crew that the rotor assembly should be indexed if a rotor blade lies in the movement path of the transmission access door when sequenced to the fully open position. After indexing to clear the rotor blade, the detent mechanism 78 may be manually activated to disengage from the telescoping member 76. The telescoping member 76 then continues to extend until the transmission access door is in the fully open position. The panel support subassembly 70 is operative to support the access panel 100 in the fully open position.

Figure 4:
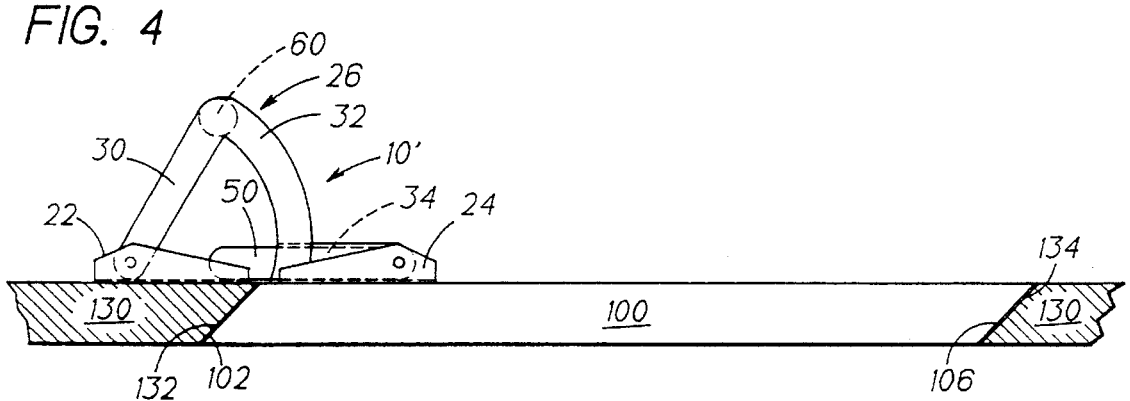
FIG. 4 is a cross-sectional view of the duplex hinge assembly of FIG. 3 in the closed position.

The embodiment of the duplex hinge assembly 10' depicted in FIGS. 3–4, and optionally the embodiment of the duplex hinge assembly 10 depicted in FIGS. 1–2, includes the stabilizing member 60. With the dual hinge mechanisms 20, 20 secured in combination with the access panel 100 and the airframe 130, the stabilizing member 60 is secured in combination with the interconnecting members 26 of the hinge mechanisms 20, 20. For the embodiment illustrated in FIG. 3, each end 62 of the stabilizing member, 60 is secured in combination with the respective interconnecting member 26 at the juncture between the straight and curved segments 30, 32 thereof. Securement may be accomplished by any of several conventional techniques, e.g., welding, fasteners. The stabilizing member 60 is operative to stabilize the hinge mechanisms 20, 20 and the access panel 100 during opening and closing sequencing to preclude torqueing of the access panel 100, i.e., inducing out-of-plane displacements in the access panel 100. The stabilizing member 60 illustrated in FIG. 3 is a torque tube. One skilled in the art will appreciate that any structural configuration that is able to react torque may be utilized as the stabilizing member 60 to interconnect the hinge mechanisms 20, 20. Conventional "gooseneck" hinges, in contrast, do not utilize a stabilizing member inasmuch as only a single hinge mechanism is utilized, and the single hinge mechanism is securely attached to the access panel.

Figure 5A:
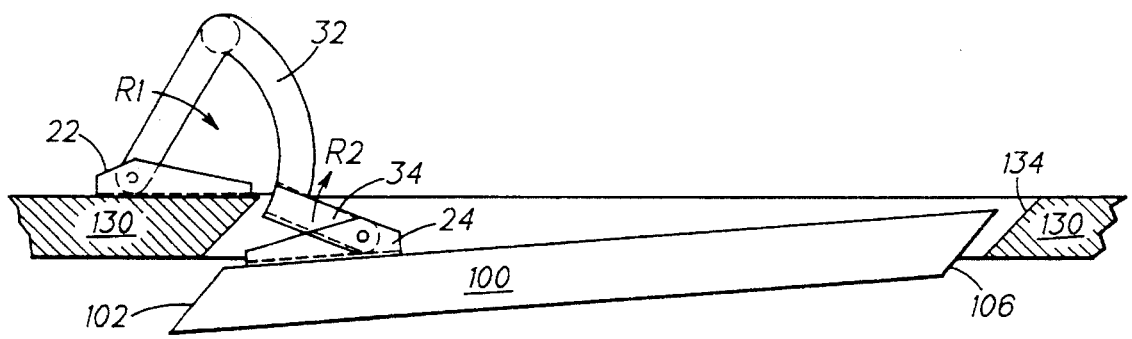
FIGS. 5A–5C illustrate the sequencing for opening an access panel door utilizing a duplex hinge assembly according to the present invention.
Figure 5B:
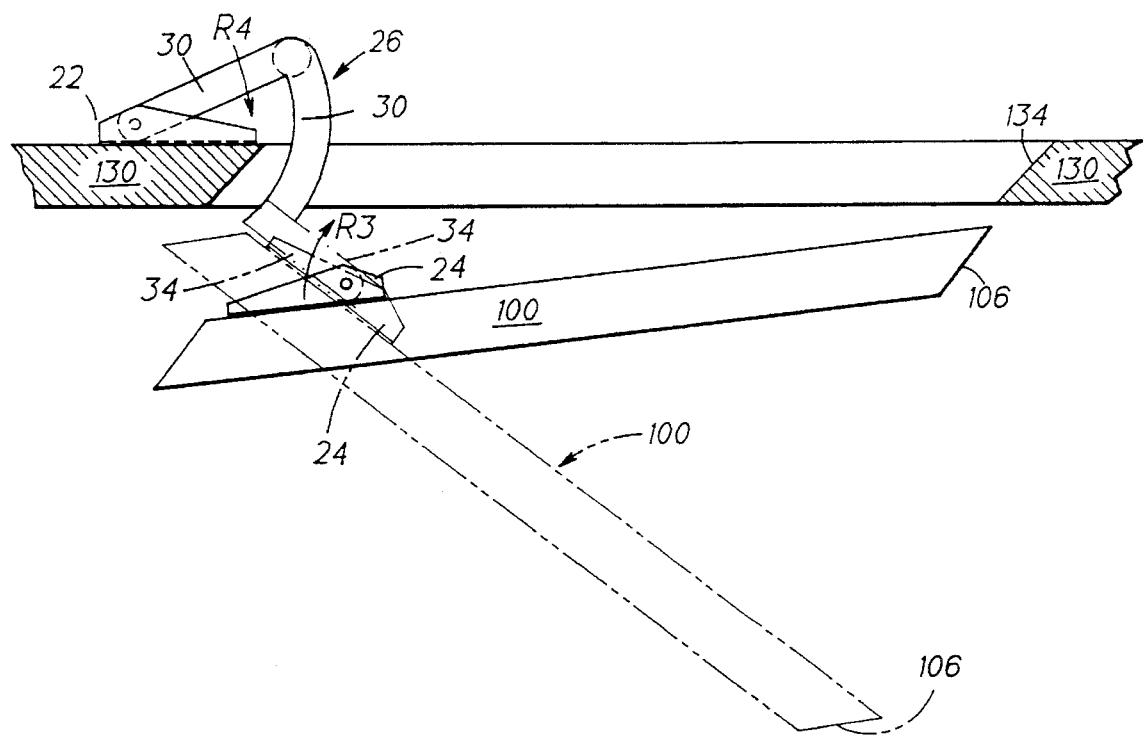
Figure 5C:
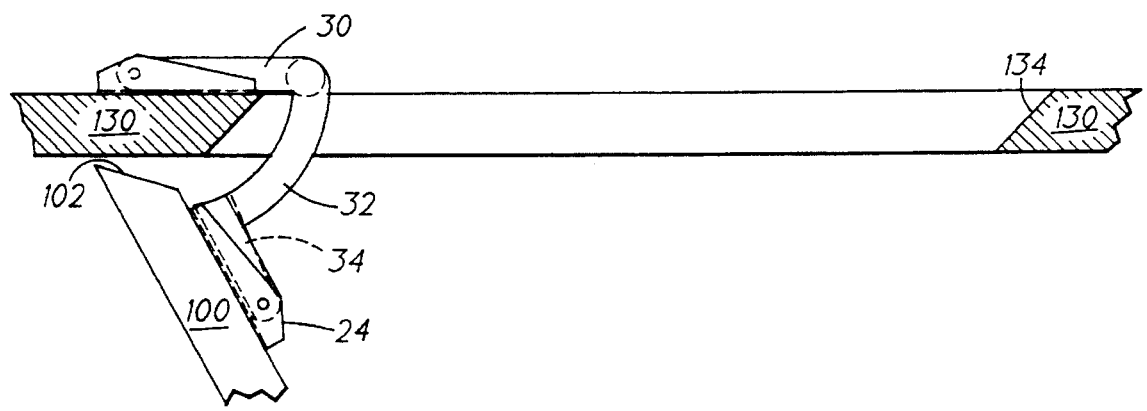

The sequence of the opening operation of the access panel 100 as a result of the duplex hinge assembly 10 or 10' according to the present invention is illustrated in FIGS. 5A–5C. To open the access panel 100 from the closed position (see FIGS. 2A, 4), the latching means 50 of the duplex hinge assembly 10 or 10' is disengaged, e.g., by mechanically disengaging the locking plunger 50 from the primary mounting bracket 22 (the open position of the locking plunger 50 is exemplarily depicted in FIG. 5A). Disengagement of the latching means 50 allows the forward open beveled edge 102 of the access panel 100 to be moved outwardly from the complementarily-configured beveled edge 132 of the airframe 130. The outward movement of the access panel 100 is facilitated by the action of the duplex hinge assembly 10 or 10' wherein the interconnecting member 26 rotates about the primary and secondary mounting brackets 22, 24. More specifically, the straight segment 30 rotates about the primary mounting bracket 22 as illustrated by arrow R1 in FIG. 5A, and, concomitantly, the protective flat segment 34 rotates about the secondary mounting bracket 24 as illustrated by arrow R2 in FIG. 5A. The rotational movement of the dual hinge mechanisms 20, 20 causes the aft beveled locking edge 106 of the access panel 100 to disengage from the complementarily-configured beveled edge 134 of the airframe. The spherical bearing 46 and the aft alignment pin 42 of the aft locking subassembly 40 interact to accommodate the disengaging motion of the aft beveled locking edge 106.

When the aft locking beveled edge 106 clears the complementarily-configured beveled edge 134 (the access panel 100 depicted in solid lines in FIG. 5B), the aft alignment pin 42 is completely disengaged from the spherical bearing 46. At this time, the protective flat segment 34 of the interconnecting member 26 rotates further (as shown by arrow R3 in FIG. 5B) with respect to the secondary mounting bracket 24 until the protective flat segment 34 abuts against the secondary mounting bracket 24 (as illustrated by the access panel 100 depicted in dashed lines in FIG. 5B). The abutting engagement of the protective flat segment 34 with the secondary mounting bracket 24 precludes further rotational movement with respect to the secondary mounting bracket 24. The abutting engagement prevents damage to the forward open beveled edge 102 of the access panel 100 during the panel opening sequence by preventing the beveled edge 102 from rotating into the complementarily-configured beveled edge 132 of the airframe 130 (contrast with FIG. 6).

With the protective flat segment 34 abutting against the secondary mounting bracket 22, no further rotation occurs between these elements. The straight segment 30, however, continues to rotate with respect to the primary mounting bracket 22 (as illustrated by arrow R4 in FIG. 5B) until the straight segment 30 abuttingly engages the primary mounting bracket 22 as illustrated in FIG. 5C. FIG. 5C represents the fully open position of the access panel 100. To close and secure the access panel 100 in combination with the airframe 130, the opening procedure described in the preceding paragraphs is reversed. The latching means 50 is actuated to lock the access panel 100 in closed position by deactivating the duplex hinge assembly 10 or 10'.

Utilization of a conventional "gooseneck" hinge mechanism, in contrast, is extremely disadvantageous. A conventional "gooseneck" hinge has a single pivot point on the airframe. The "gooseneck" configuration allows the access panel to be flush mounted while still being operative to facilitate access panel clearance of the airframe during opening/closing, even when the shape of the access panel and/or airframe is convex or irregular. Operation of a "gooseneck" hinge in such circumstances may cause certain problems during opening/closing of the access panel. For example, at the initiation of the opening sequence there may be interference between the access panel and airframe. That is, the aft beveled edge of the access panel may not readily clear the corresponding beveled edge of the airframe. If the aft edge of the access panel and the corresponding portion of the airframe are modified to a straight edge configuration to obviate the interference problem described hereinabove, an aft locking mechanism is then required to maintain the access panel in closed combination with the airframe.

Figure 6:
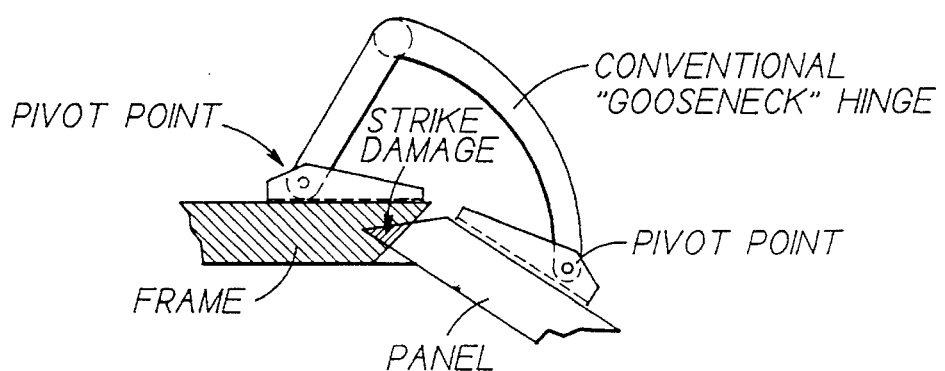
FIG. 6 illustrates a double pivot hinge assembly, which lacks a protective flat segment according to the present invention to safeguard against access panel damage.

Thus, to eliminate interference problems and/or the need to utilize an aft locking mechanism, the duplex hinge assembly 10, 10' according to the present invention has a configuration that incorporates dual pivot points. However, a hinge mechanism having dual pivot points alone is not sufficient to protect the access panel from damage during opening/closing thereof. As illustrated in FIG. 6 wherein an access panel is mounted in movable combination with the airframe utilizing a dual-pivoting hinge mechanism, the access panel may rotate about its pivot point during the opening sequence, causing the forward beveled edge of the access panel to strike the corresponding beveled edge of the airframe. This particular problem is eliminated by the protective flat segment 34 of the duplex hinge assembly 10, 10' according to the present invention.

A variety of modifications and variations of the present invention are possible in light of the above teachings. It is therefore to be understood that, within the scope of the appended claims, the present invention may be practiced otherwise than as specifically described hereinabove.

What is claimed is:

1. A duplex hinge assembly for an aircraft having a compound curvature airframe and access panel, the access panel having forward and side edges having an open beveled configuration and an aft edge having a beveled locking configuration, and the compound curvature airframe having complementarily-configured beveled edges defining an opening for the access panel, comprising:

dual hinge mechanisms mounted in combination with the access panel and the airframe and operative to allow movement of the access panel for opening thereof, said dual hinge mechanisms including means for preventing strike damage in the access panel during opening and closing thereof;

an aft pin subassembly means mounted in combination with the access panel and the airframe for maintaining the access panel in the closed position, said aft pin subassembly means being further operative to accommodate motion of the aft beveled locking edge of the access panel with respect to the complementarily-configured edge of the airframe during the opening sequence; and latching means for deactivating said duplex hinge assembly with the access panel in the closed position.

2. The duplex hinge assembly of claim 1 wherein each of said dual hinge mechanisms comprise:

a primary mounting bracket secured in combination with the airframe adjacent the forward edge of the access panel;

a secondary mounting bracket secured in combination with the access panel adjacent the forward open beveled edge thereof; and an interconnecting member having ends mounted in rotatable combination with said primary and secondary mounting brackets; and further wherein a stabilizing member is secured to said interconnecting member of each of said dual hinge mechanisms.

3. The duplex hinge assembly of claim 2 wherein said interconnecting member comprises an integral member having a gooseneck configuration that includes a straight segment, an arcuate segment, and a protective flat segment, a free end of said straight segment being mounted in rotatable combination with said primary mounting bracket and a free end of said protective flat segment being mounted in rotatable combination with said secondary mounting bracket, and wherein said protective flat segment rotates into abutting engagement with said secondary mounting bracket during opening and closing of the access panel to prevent strike damage to the access panel.

4. The duplex hinge assembly of claim 1 wherein said aft locking subassembly comprises:

a spherical bearing;

a mounting bracket for mounting said spherical bearing in combination with the airframe adjacent the aft edge of the access panel;

an aft alignment pin; and a mounting bracket for mounting said aft alignment pin in combination with the access panel adjacent the aft beveled locking edge thereof;

said spherical bearing and said aft alignment pin being mounted so that said aft alignment pin is aligned for insertion into and frictional engagement with said spherical bearing during closing of the access panel;

said spherical bearing and said aft alignment pin interacting during opening of the access panel to accommodate movement of the aft beveled locking edge of the access panel during opening thereof.

5. The duplex hinge assembly of claim 1 further comprising:

panel support assembly means mounted in combination with the access panel and the airframe for supporting and maintaining the access panel in a partially open position during opening sequencing of the access panel, said panel support assembly means being further operative to support and maintain the access panel in a fully open position.

6. The duplex hinge assembly of claim 5 wherein said panel support assembly means comprises:

a first mounting bracket secured to the access panel;

a second mounting bracket secured to the airframe;

a telescoping member having ends thereof mounted in rotatable combination with said first and second mounting brackets, respectively, said telescoping member being operative for extension during opening sequencing of the access panel; and detent means disposed in operative combination with said telescoping member for engaging said telescoping member during opening sequencing to stop extension thereof wherein the access panel is supported and maintained in the partially open position, said detent means being activatable to disengage from the telescoping member wherein the telescoping member continues extending until the access panel reaches the fully open position.

7. A duplex hinge assembly for an aircraft having a compound curvature airframe and access panel, the access panel having forward and side edges having an open beveled configuration and an aft edge having a locking beveled configuration, and the compound curvature airframe having complementarily-configured beveled edges defining an opening for the access panel, comprising:

a pair of spaced apart primary mounting brackets secured in combination with the airframe adjacent the forward open beveled edge of the access panel;

a pair of spaced apart secondary mounting brackets secured in combination with the access panel adjacent the forward open beveled edge thereof;

an integral interconnecting member for each combination of said primary and secondary mounting brackets, each said integral interconnecting member having a straight segment mounted in rotatable combination with said primary mounting bracket, an arcuate segment contiguous with said straight segment, and a protective flat segment contiguous with said arcuate segment and mounted in rotatable combination with said secondary mounting bracket;

a spherical bearing;

a mounting bracket for mounting said spherical bearing in combination with the airframe adjacent the aft edge of the access panel;

an aft alignment pin;

a mounting bracket for mounting said aft alignment pin in combination with the access panel adjacent the aft beveled locking edge thereof;

said spherical bearing and said aft alignment pin being mounted so that said aft alignment pin is aligned for insertion into and frictional engagement with said spherical bearing during closing of the access panel;

said spherical bearing and said aft alignment pin interacting during opening of the access panel to accommodate movement of the aft beveled locking edge of the access panel during opening thereof; and latching means for deactivating said duplex hinge assembly with the access panel in the closed position wherein rotational movement of said integral interconnecting members is prevented; and wherein said protective flat segments rotate into abutting engagement with said secondary mounting brackets during opening and closing of the access panel to prevent strike damage to the access panel.

8. The duplex hinge assembly of claim 7 further comprising a panel support assembly, said panel support assembly including a first mounting bracket secured to the access panel;

a second mounting bracket secured to the airframe;

a telescoping member having ends thereof mounted in rotatable combination with said first and second mounting brackets, respectively, said telescoping member being operative for extension during opening sequencing of the access panel; and detent means disposed in operative combination with said telescoping member for engaging said telescoping member during opening sequencing to stop extension thereof wherein the access panel is supported and maintained in the partially open position, said detent means being activatable to disengage from the telescoping member wherein the telescoping member continues extending until the access panel reaches the fully open position.

9. A duplex hinge assembly for an aircraft having a compound curvature airframe and access panel, the access panel having forward and side edges having an open beveled configuration and an aft edge having a beveled locking configuration, and the compound curvature airframe having complementarily-configured beveled edges defining an opening for the access panel, comprising:

dual hinge mechanisms mounted in combination with the access panel and the airframe and operative to allow movement of the access panel for opening thereof, said dual hinge mechanisms including means for preventing strike damage in the access panel during opening and closing thereof;

a stabilizing member secured in combination with said respective dual hinge mechanisms and operative to preclude torqueing of the access panel during opening and closing thereof; and latching means for deactivating said duplex hinge assembly with the access panel in the closed position.

10. The duplex hinge assembly of claim 9 wherein each of said dual hinge mechanisms comprise:

a primary mounting bracket secured in combination with the airframe adjacent the forward edge of the access panel;

a secondary mounting bracket secured in combination with the access panel adjacent the forward open beveled edge thereof; and an interconnecting member having ends mounted in rotatable combination with said primary and secondary mounting brackets; and wherein said stabilizing member being secured to said interconnecting member of each of said dual hinge mechanisms.

11. The duplex hinge assembly of claim 10 wherein said interconnecting member comprises an integral member having a gooseneck configuration that includes a straight segment, an arcuate segment, and a protective flat segment, a free end of said straight segment being mounted in rotatable combination with said primary mounting bracket and a free end of said protective flat segment being mounted in rotatable combination with said secondary mounting bracket, and wherein said protective flat segment rotates into abutting engagement with said secondary mounting bracket during opening and closing of the access panel to prevent strike damage to the access panel.

12. A duplex hinge assembly for an aircraft having a compound curvature airframe and access panel, the access panel having forward and side edges having an open beveled configuration and an aft edge having a locking beveled configuration, and the compound curvature airframe having complementarily-configured beveled edges defining an opening for the access panel, comprising:

a pair of spaced apart primary mounting brackets secured in combination with the airframe adjacent the forward open beveled edge of the access panel;

a pair of spaced apart secondary mounting brackets secured in combination with the access panel adjacent the forward open beveled edge thereof;

an integral interconnecting member for each combination of said primary and secondary mounting brackets, each said integral interconnecting member having a straight segment mounted in rotatable combination with said primary mounting bracket, an arcuate segment contiguous with said straight segment, and a protective flat segment contiguous with said arcuate segment and mounted in rotatable combination with said secondary mounting bracket;

a stabilizing member secured in combination with said integral interconnecting members and operative to preclude torqueing of the access panel during opening and closing thereof; and latching means for deactivating said duplex hinge assembly with the access panel in the closed position wherein rotational movement of said integral interconnecting members is prevented; and wherein said protective flat segments rotate into abutting engagement with said secondary mounting brackets during opening and closing of the access panel to prevent strike damage to the access panel.

* * * * *